US009151210B2

(12) United States Patent
Komuro et al.

(10) Patent No.: US 9,151,210 B2
(45) Date of Patent: Oct. 6, 2015

(54) FLUID CONTROL VALVE

(71) Applicant: AISIN SEIKI KABUSHIKI KAISHA, Kariya-shi (JP)

(72) Inventors: Kenichi Komuro, Obu (JP); Masanobu Matsusaka, Chita (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/067,174

(22) Filed: Oct. 30, 2013

(65) Prior Publication Data
US 2014/0137817 A1 May 22, 2014

(30) Foreign Application Priority Data

Nov. 20, 2012 (JP) ................. 2012-254431

(51) Int. Cl.
*F16K 31/06* (2006.01)
*F01P 7/16* (2006.01)
(52) U.S. Cl.
CPC ............. *F01P 7/16* (2013.01); *F16K 31/0651* (2013.01); *F16K 31/0658* (2013.01); *Y10T 137/87507* (2015.04)
(58) Field of Classification Search
CPC ............ F16K 31/0658; F16K 31/0651; Y10T 137/87507
USPC .......................... 251/129.02, 129.21, 129.16; 137/601.18, 601.14; 335/274
See application file for complete search history.

(56) References Cited

U.S. PATENT DOCUMENTS

| | | | | |
|---|---|---|---|---|
| 4,690,374 A * | 9/1987 | Polach et al. | ............ | 251/129.02 |
| 4,919,497 A * | 4/1990 | Kaes | ......................... | 303/119.2 |
| 5,255,733 A * | 10/1993 | King | ............................. | 165/299 |
| 6,612,338 B2 * | 9/2003 | Weldon et al. | ........... | 137/630.19 |
| 6,651,953 B2 * | 11/2003 | Weldon | ..................... | 251/129.02 |
| 8,118,054 B2 * | 2/2012 | Glaudel et al. | ................ | 137/270 |
| 2012/0061596 A1 | 3/2012 | Hensel et al. | | |
| 2013/0161548 A1 * | 6/2013 | Matsusaka et al. | ...... | 251/129.22 |

FOREIGN PATENT DOCUMENTS

| | | |
|---|---|---|
| DE | 3219834 A1 | 12/1983 |
| DE | 102010042573 A1 | 4/2012 |
| JP | 2012-97835 A | 5/2012 |
| JP | WO 2012060188 A1 * | 5/2012 |
| JP | WO 2012063611 A1 * | 5/2012 |
| WO | WO 2011132530 A2 * | 10/2011 |

OTHER PUBLICATIONS

Extended European Search Report dated Feb. 21, 2014, issued by the European Patent Office in corresponding European Patent Application No. 13190696.8 (5 pgs.).

* cited by examiner

*Primary Examiner* — Craig Schneider
*Assistant Examiner* — Josephine Trinidad-Borges
(74) *Attorney, Agent, or Firm* — Buchanan Ingersoll & Rooney PC

(57) ABSTRACT

A fluid control valve includes a body portion provided at a circulation flow passage that circulates fluid between an internal combustion engine and a heat exchanger, an inflow passage, an outflow passage, a valve element, a valve seat including a contact portion relative to the valve element, the contact portion being provided to face a downstream side of a circulating direction of the fluid, a solenoid causing the valve element to make contact with the valve seat in a state where the solenoid is supplied with an electric power, and a spring mechanism holding the valve element to be balanced at a position at which the valve element is away from the valve seat by a predetermined distance in a case where the solenoid is inhibited from being supplied with the electric power and the fluid is inhibited from flowing.

5 Claims, 7 Drawing Sheets

Water flowing state (no power supply)

Initial state (no power supply)

ated at the internal combustion engine to the heat exchanger, for example, to a heater core. JP2012-97835A, which will be hereinafter referred to as Reference 1, discloses a fluid control valve including a spring that biases a valve element to make contact with a valve seat so that a valve-closed state in which the valve element is in contact with the valve seat may be held in a state where a solenoid is not powered.
FLUID CONTROL VALVE

CROSS REFERENCE TO RELATED APPLICATIONS

This application is based on and claims priority under 35 U.S.C. §119 to Japanese Patent Application 2012-254431, filed on Nov. 20, 2012, the entire content of which is incorporated herein by reference.

TECHNICAL FIELD

This disclosure generally relates to a fluid control valve.

BACKGROUND DISCUSSION

A known fluid control valve includes a body portion provided at a circulation flow passage circulating fluid between an internal combustion engine and a heat exchanger, an inflow passage causing the fluid to flow into the body portion, an outflow passage causing the fluid to flow out of the body portion, a valve element adjusting a flow rate of the fluid, a valve seat including a contact portion relative to the valve element, the contact portion facing a downstream side of a circulating direction of the fluid, and a solenoid causing the valve element to make contact with the valve seat in a state where the solenoid is supplied with an electric power.

In a cooling apparatus cooling the internal combustion engine, i.e., an automotive engine, for example, the aforementioned fluid control valve is provided at the circulation flow passage circulating cooling water serving as fluid between the internal combustion engine and the heat exchanger so as to control a flow rate of the cooling water that is heated at the internal combustion engine to the heat exchanger, for example, to a heater core. JP2012-97835A, which will be hereinafter referred to as Reference 1, discloses a fluid control valve including a spring that biases a valve element to make contact with a valve seat so that a valve-closed state in which the valve element is in contact with the valve seat may be held in a state where a solenoid is not powered.

According to the known fluid control valve such as disclosed in Reference 1, for example, in a case where the solenoid is not powered, the valve-closed state is maintained until a fluid pressure at the inflow passage increases to a value that overcomes a biasing force of the spring. Therefore, while the fluid pressure at the inflow passage is increasing to the value that overcomes the biasing force of the spring, the fluid is inhibited from circulating. As a result, a flow rate range in which the flow rate of fluid is controllable may decrease. In addition, because a pressure-receiving area of the valve element that receives the fluid pressure at the inflow passage rapidly increases in association with a separation of the valve element from the valve seat, a gap or a clearance between the valve element and the valve seat increases rapidly, which may lead to an unstable flow rate control at a time of a low flow rate of fluid. Further, in a case where a metal touch occurs in the contact of the valve element relative to the valve seat, rust may be generated due to electrochemical reaction, for example. In such case, the valve element and the valve seat may adhere to each other, which inhibits timely controlling the flow rate based on the increase of the fluid pressure or which deteriorates a shut-off function of the valve element because of rust that adheres to the valve element and/or the valve seat.

A need thus exists for a fluid control valve which is not susceptible to the drawback mentioned above.

SUMMARY

According to an aspect of this disclosure, a fluid control valve includes a body portion provided at a circulation flow passage that circulates fluid between an internal combustion engine and a heat exchanger, an inflow passage causing the fluid to flow into the body portion, an outflow passage causing the fluid to flow out of the body portion, a valve element adjusting a flow rate of the fluid, a valve seat including a contact portion relative to the valve element, the contact portion being provided to face a downstream side of a circulating direction of the fluid, a solenoid causing the valve element to make contact with the valve seat in a state where the solenoid is supplied with an electric power, and a spring mechanism holding the valve element to be balanced at a position at which the valve element is away from the valve seat by a predetermined distance in a case where the solenoid is inhibited from being supplied with the electric power and the fluid is inhibited from flowing.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
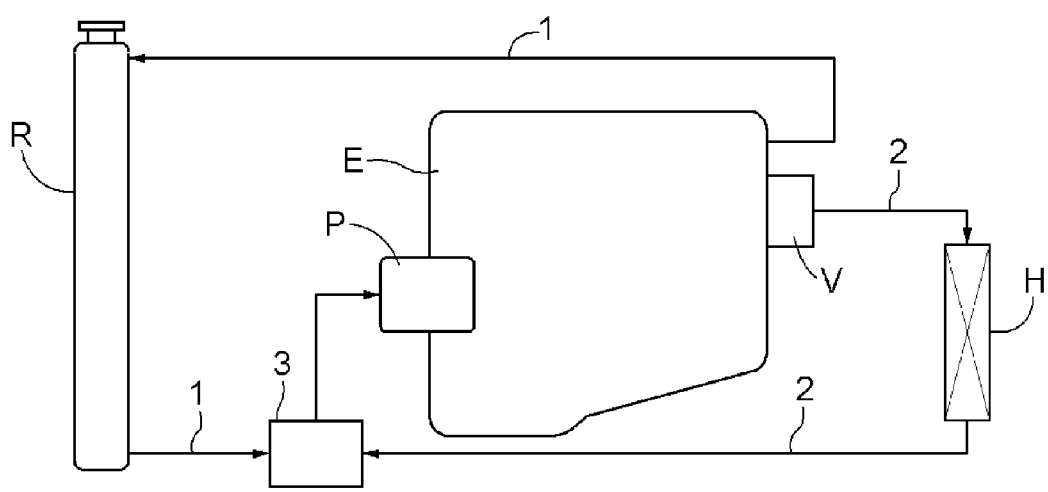
FIG. 1 is a schematic view of a cooling system including a fluid control valve according to first to third embodiments disclosed here.

A first embodiment will be explained with reference to FIGS. 1 to 5. FIG. 1 illustrates a cooling system of an engine for a vehicle serving as an internal combustion engine at which a fluid control valve V is mounted. The cooling system includes a radiator circulation flow passage 1 circulating cooling water serving as fluid between an engine E serving as the internal combustion engine and a radiator R serving as a heat exchanger, a heater core circulation flow passage 2 circulating the cooling water between the engine E and a heater core H serving as the heat exchanger, and a water pump P supplying the cooling water to a cooling water jacket.

In the radiator circulation flow passage 1, an outflow passage of the cooling water from the radiator R is connected to the water pump P via a thermostat valve 3. In the radiator circulation flow passage 1, the cooling water heated at the engine E flows to the radiator R and then the cooling water that is cooled at the radiator R flows back to the engine E via the thermostat valve 3 by means of the water pump P.

In the heater core circulation flow passage 2 serving as a circulation flow passage, an outflow passage of the cooling water from the heater core H is connected to the water pump P via the thermostat valve 3 in the same way as the radiator circulation flow passage 1. The fluid control valve V according to the present embodiment is provided at an outflow passage of the cooling water from the engine E to the heater core H in the heater core circulation flow passage 2. The fluid control valve V is provided to control a circulation flow rate of the cooling water from the engine E to the heater core H.

In the heater core circulation flow passage 2, the cooling water heated at the engine E flows to the heater core H heating air within a vehicle cabin via the fluid control valve V, and the cooling water that is cooled by heat exchange with the heater core H flows back to the engine E via the thermostat valve 3 by means of the water pump P.

Figure 2:
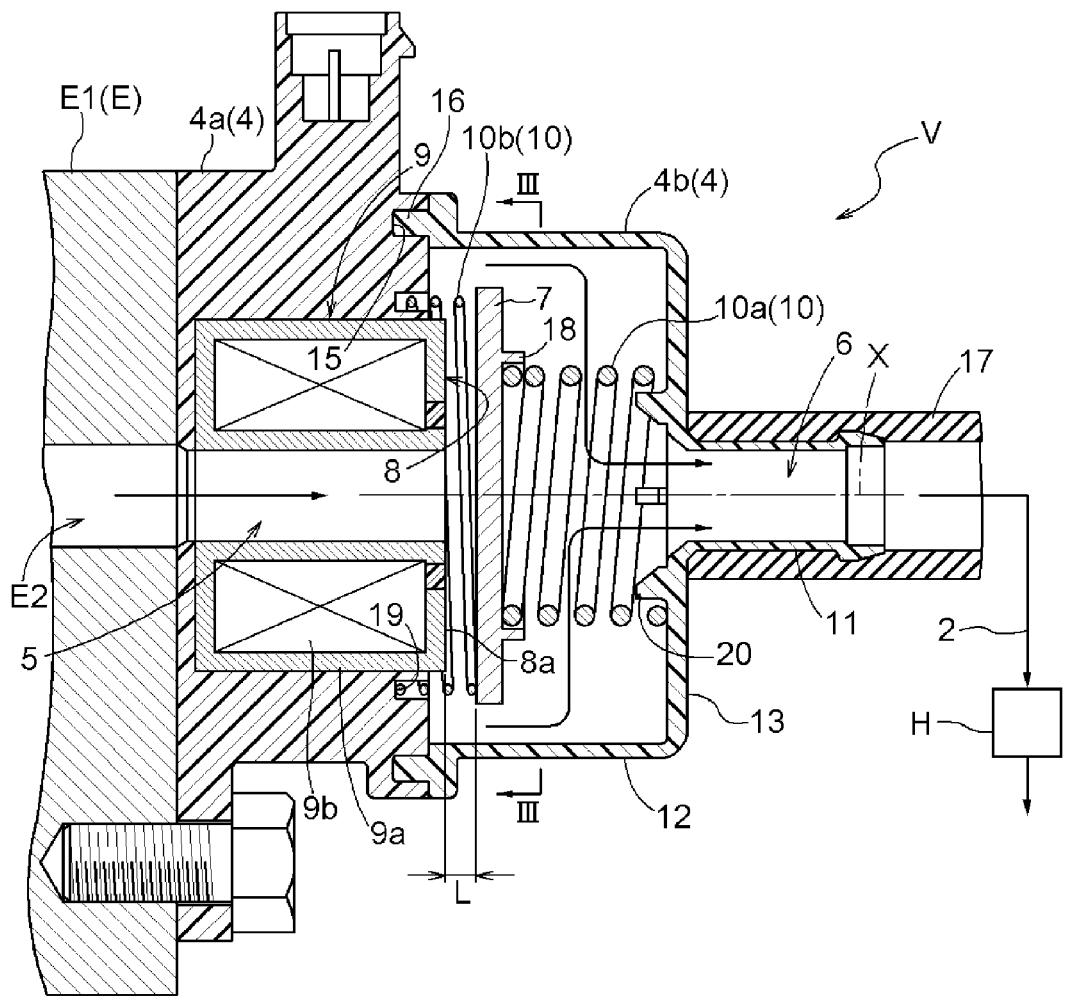
FIG. 2 is a cross-sectional view of the fluid control valve in an initial state according to the first embodiment disclosed here.
Figure 3:
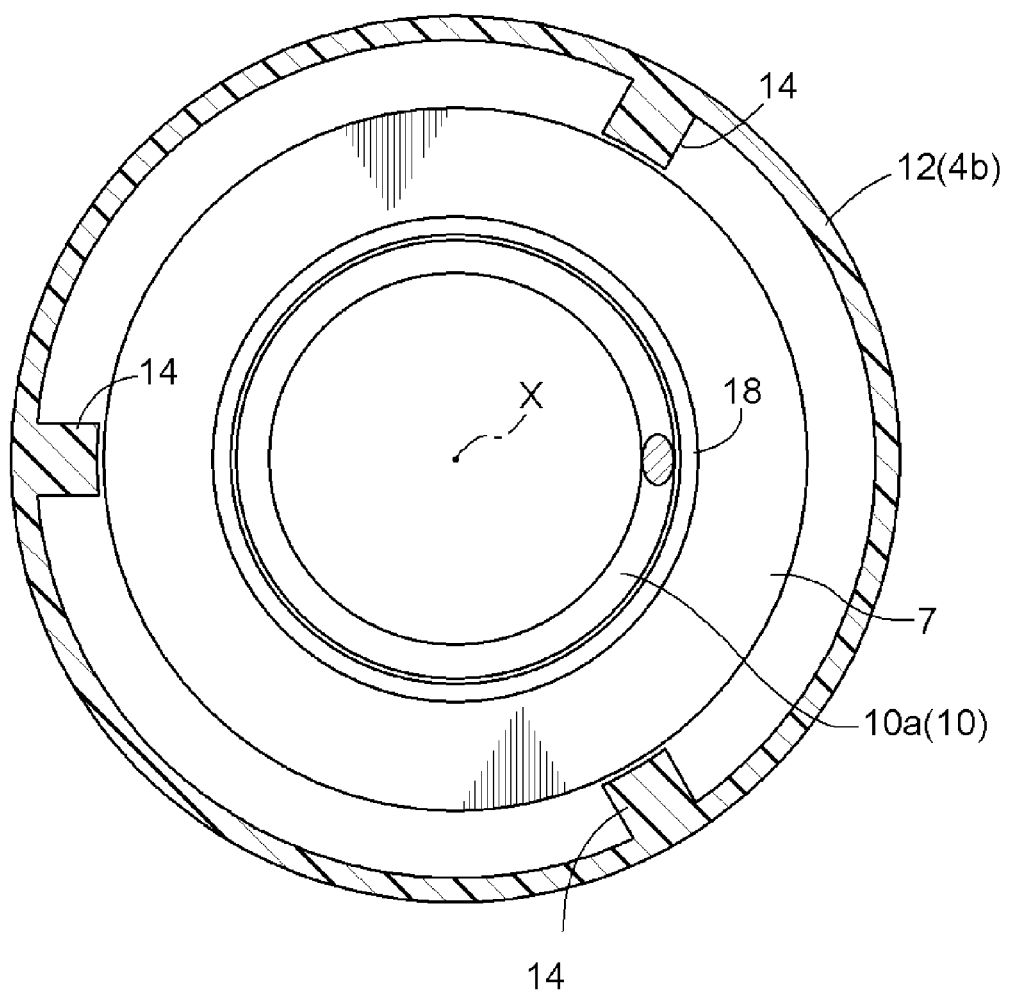
FIG. 3 is a cross-sectional view taken along line III-III in FIG. 2.
Figure 4:
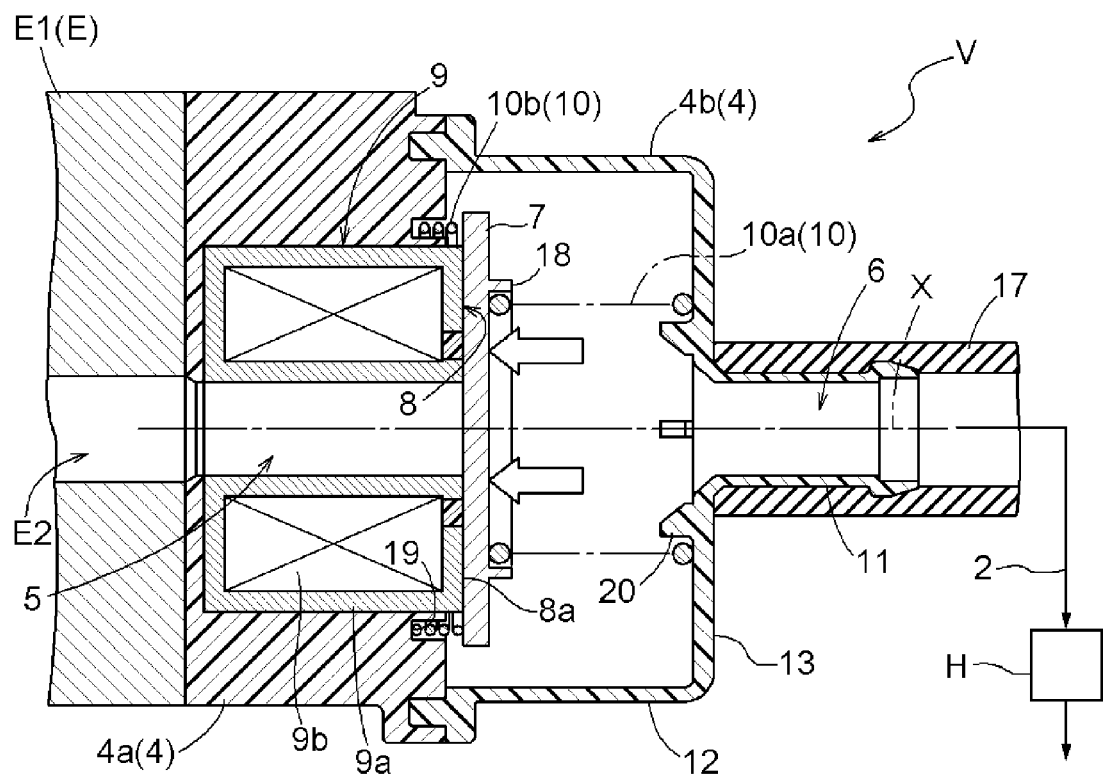
FIG. 4 is a cross-sectional view of the fluid control valve in a closed state (i.e., in a water non-flowing state)

As illustrated in FIGS. 2 and 3, the fluid control valve V includes a valve case 4 serving as a body portion, an inflow passage 5, an outflow passage 6, a valve element 7, a valve seat 8, a solenoid 9, and a spring mechanism 10. The valve case 4 is provided at a contact portion of the heater core circulation flow passage 2 relative to the engine E. The inflow passage 5 causes the cooling water to flow into the valve case 4. The outflow passage 6 causes the cooling water to flow out of the valve case 4. The valve element 7 in a disc form adjusts a flow rate of the cooling water. The valve seat 8 includes a contact portion 8a relative to the valve element 7, the contact portion 8a being provided to face a downstream side of a circulating direction of the cooling water. The solenoid 9 causes the valve element 7 serving as a plunger to make contact with the valve seat 8 in a state to be supplied with an electric power. The spring mechanism 10 holds the valve element 7 to be balanced at an initial position in which the valve element 7 is away from the valve seat 8 by a predetermined distance L in a case where the solenoid 9 is inhibited from being supplied with the electric power and the cooling water is inhibited from flowing.

The valve case 4 includes a first case 4a in a cylindrical form including the inflow passage 5, and a second case 4b in a cylindrical form including the outflow passage 6. The first case 4a and the second case 4b are integrally formed to be concentric with each other. The first case 4a is fixed to an engine block E1 via a bolt so that the inflow passage 5 is connected to a cooling water outlet port E2 that is formed at the engine block E1. The second case 4b integrally includes a connection tube portion 11 in a cylindrical form, a cylindrical portion 12, and a wall plate portion 13 in an annular form. The connection tube portion 11 forms the outflow passage 6 at an inner side. The cylindrical portion 12 includes a larger diameter than a diameter of the connection tube portion 11. The wall plate portion 13 forms a stepped portion connecting between the connection tube portion 11 and the cylindrical portion 12. The connection tube portion 11, the cylindrical portion 12, and the wall plate portion 13 are provided to be concentric with one another. An entrance of the outflow passage 6 opens in the wall plate portion 13.

As illustrated in FIG. 3, three guide projecting portions 14 are integrally formed at an inner peripheral side of the cylindrical portion 12 to extend along an axis X. Specifically, the three guide projecting portions 14 are formed at substantially even intervals in a circumferential direction of the cylindrical portion 12. The valve element 7 is assembled on an inner side of the cylindrical portion 12 in a state where an outer peripheral surface of the valve element 7 is surrounded by the three guide projecting portions 14. The valve element 7 is held to be movable in a reciprocating manner along the axis X by being guided by the guide projecting portions 14.

As illustrated in FIG. 2, the first case 4a and the second case 4b are integrally connected to each other in a water-tightness manner in a state where an annular projection 16 formed at a flange portion of the cylindrical portion 12 is fitted to an annular groove 15 formed at an end surface of the first case 4a. A tube 17 is connected to the connection tube portion 11 for introducing the cooling water to the heater core H from the outflow passage 6.

The solenoid 9 is accommodated within the first case 4a. The solenoid 9 includes a coil 9b wound at a core 9a or a bobbin, for example, so that the coil 9b is arranged to be coincide with the first case 4a. An inner hollow portion of the core 9a that is in a cylindrical form defines the inflow passage 5 together with a penetration bore formed at the first case 4a. An end surface of the core 9a facing the second case 4b functions as the valve seat 8.

The spring mechanism 10 includes a first coil spring 10a biasing the valve element 7 to approach, i.e., come closer to, the valve seat 8 and a second coil spring 10b biasing the valve element 7 to separate from the valve seat 8. The solenoid 9 is excited by the power supply to the coil 9b so that the valve element 7 is pulled or suctioned to the valve seat 8, i.e., the valve element 7 makes contact with the valve seat 8, against the biasing force of the second coil spring 10b. As a result, the fluid control valve V is held in a closed state. In a state where the solenoid 9 is not powered and the cooling water is inhibited from flowing, the valve element 7 is held in the initial position in which the valve element 7 is away from the valve seat 8 by the predetermined distance L because of a balanced state between the first coil spring 10a and the second coil spring 10b.

The first coil spring 10a is assembled between the valve element 7 and the wall plate portion 13 of the second case 4b in a compressive deformation manner. One end of the first coil spring 10a is fitted and fixed to an inner side of an annular projecting portion 18 formed at the valve element 7. The second coil spring 10b is assembled between the valve element 7 and the first case 4a in a compressive deformation manner. One end of the second coil spring 10b is fitted and fixed to an annular recess portion 19 formed at the first case 4a. The length of the second coil spring 10b is specified so that the second coil spring 10b is inhibited from making contact with the valve element 7 and is inhibited from generating the biasing force relative to the valve element 7 (i.e., the biasing force is released) in association with the movement of the valve element 7 in a direction away from the valve seat 8 in a free state of the second coil spring 10b in which a compressive force and a tensile force are inhibited from occurring at the second coil spring 10b.

An operation of the fluid control valve V according to the present embodiment will be explained next. In a state where the solenoid 9 is not powered and the cooling water is inhibited from flowing through the heater core circulation flow passage 2 because the driving of the water pump P is stopped, i.e., in an initial state of the fluid control valve V, the valve element 7 is held at the initial position so as to be away from the valve seat 8 by the predetermined distance L because of the balanced state between the first coil spring 10a and the second coil spring 10b as illustrated in FIG. 2. Therefore, in a state where the valve element 7 is arranged in the initial position, the inflow passage 5 and the outflow passage 6 are connected to each other via a clearance between the core 9a and the valve element 7.

In a case where a vehicle driver operates an ignition key, for example, the solenoid 9 is supplied with the electric power before the engine E is started, i.e., before the water pump P is operated. Because of the power supply to the solenoid 9, the valve element 7 is pulled and suctioned to the valve seat 8, i.e., the valve element 7 makes contact with the valve seat 8, against the biasing force of the second coil spring 10b so as to hold or maintain the fluid control valve V in the closed state.

Accordingly, regardless of the operation of the water pump P in association with the start of the engine E, the inflow of the cooling water to the heater core H is blocked, which restrains the decrease of temperature of the cooling water by the heat exchange at the heater core H. In addition, in a case where the temperature of the cooling water is low, the thermostat valve 3 is closed and thus the cooling water is inhibited from flowing to the radiator R. Consequently, the increase of the temperature of the cooling water during a warm-up operation of the engine E is enhanced to facilitate the increase of the temperature of engine oil, for example, which may result in improvement of fuel efficiency.

Figure 5:
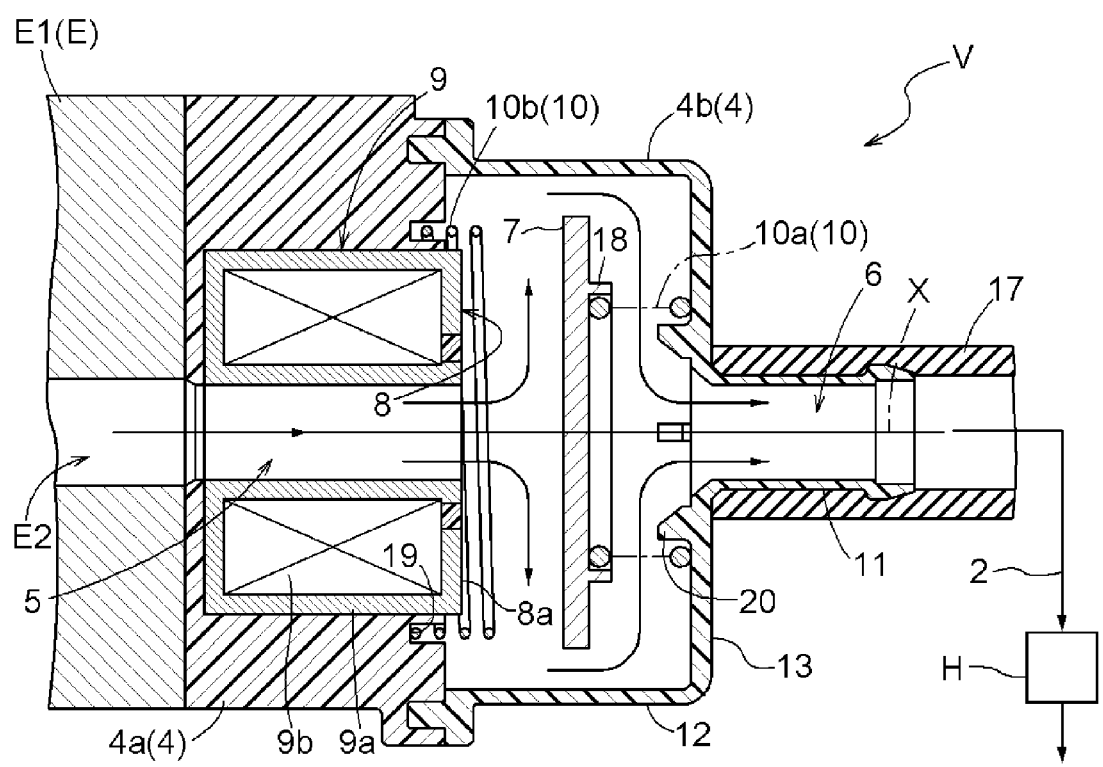
FIG. 5 is a cross-sectional view of the fluid control valve in an open state (i.e., in a water flowing state)

Thereafter, in a case where the temperature of the cooling water reaches a predetermined temperature, i.e., when the warm-up operation of the engine E is completed, the solenoid 9 is switched to a state not to be supplied with the electric power. In a state where the solenoid 9 is not powered, the valve element 7 moves to return to the initial position. In addition, as illustrated in FIG. 5, the first coil spring 10a is compressed to be deformed in a state where a water pressure of the cooling water applied to the valve element 7 against the biasing force of the first coil spring 10a and the biasing force of the first coil spring 10a are balanced out.

Accordingly, the valve element 7 moves in a direction away from the valve seat 8 from the initial position by a moving distance depending on the water pressure of the cooling water at the inflow passage 5. In addition, the biasing force applied to the valve element 7 by the second coil spring 10b is released. The cooling water flows out of the outflow passage 6 towards the heater core H through a portion or a clearance between the outer peripheral side of the valve element 7 and the inner peripheral side of the cylindrical portion 12 at a flow rate based on the water pressure of the cooling water at the inflow passage 5.

A cross section area of a flow passage formed between the outer peripheral side of the valve element 7 and the inner peripheral side of the cylindrical portion 12 is maintained constant regardless of the moving distance of the valve element 7 from the initial position thereof to the side away from the valve seat 8 depending on the water pressure of the cooling water. A movement restriction portion 20 is formed at the wall plate portion 13 of the second case 4b for restricting or limiting the moving distance of the valve element 7 from the initial position thereof by a contact with the valve element 7.

Figure 6:
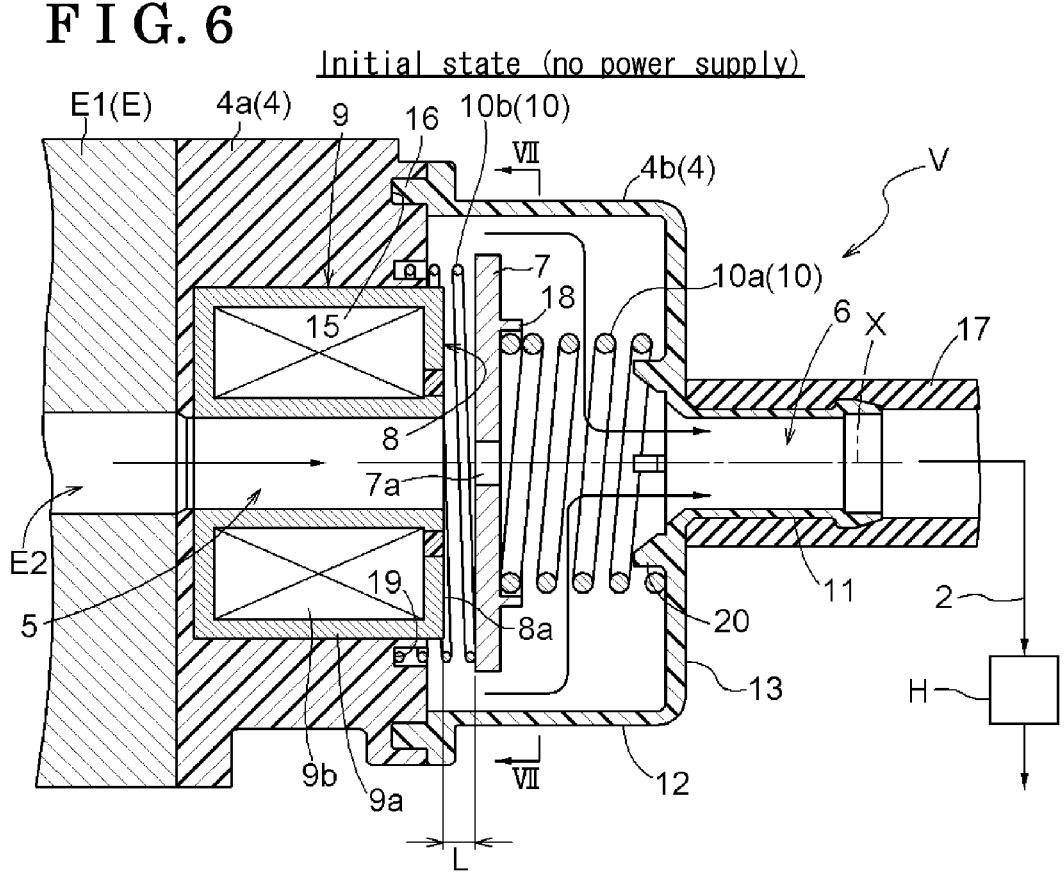
FIG. 6 is a cross-sectional view of the fluid control valve in an initial state according to the second embodiment disclosed here.
Figure 7:
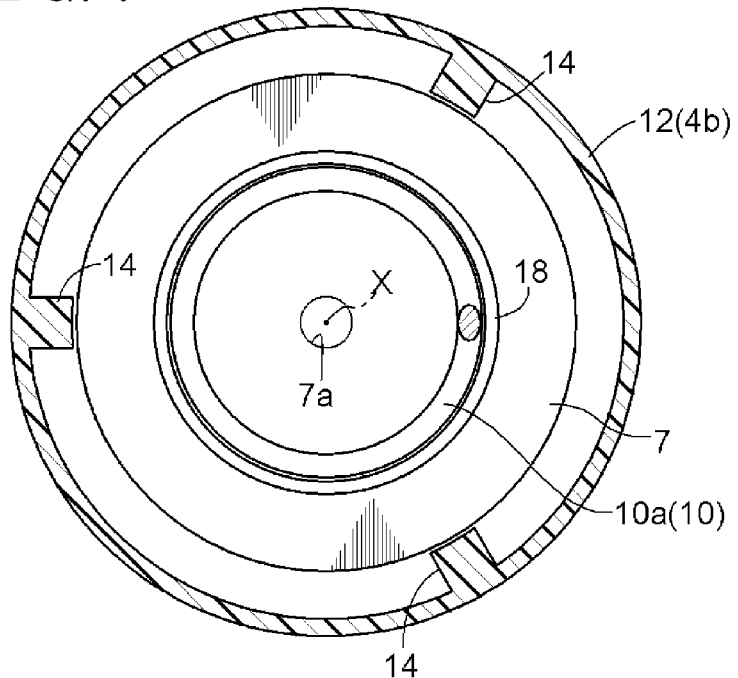
FIG. 7 is a cross-sectional view taken along line VII-VII in FIG. 6.

A second embodiment will be explained with reference to FIGS. 6 and 7. According to the fluid control valve V of the second embodiment, a penetration bore 7a in a circular form is concentrically formed at the valve element 7 for connecting between the inflow passage 5 and the outflow passage 6.

Thus, a predetermined amount of cooling water is ensured even in a state where the valve element 7 is in contact with the valve seat 8. An initial flow rate of the cooling water may be appropriately specified on a basis of an opening dimension of the penetration bore 7a in addition to the predetermined distance L between the valve element 7 and the valve seat 8. The other configurations of the second embodiment are substantially the same as the configurations of the first embodiment.

Figure 8:
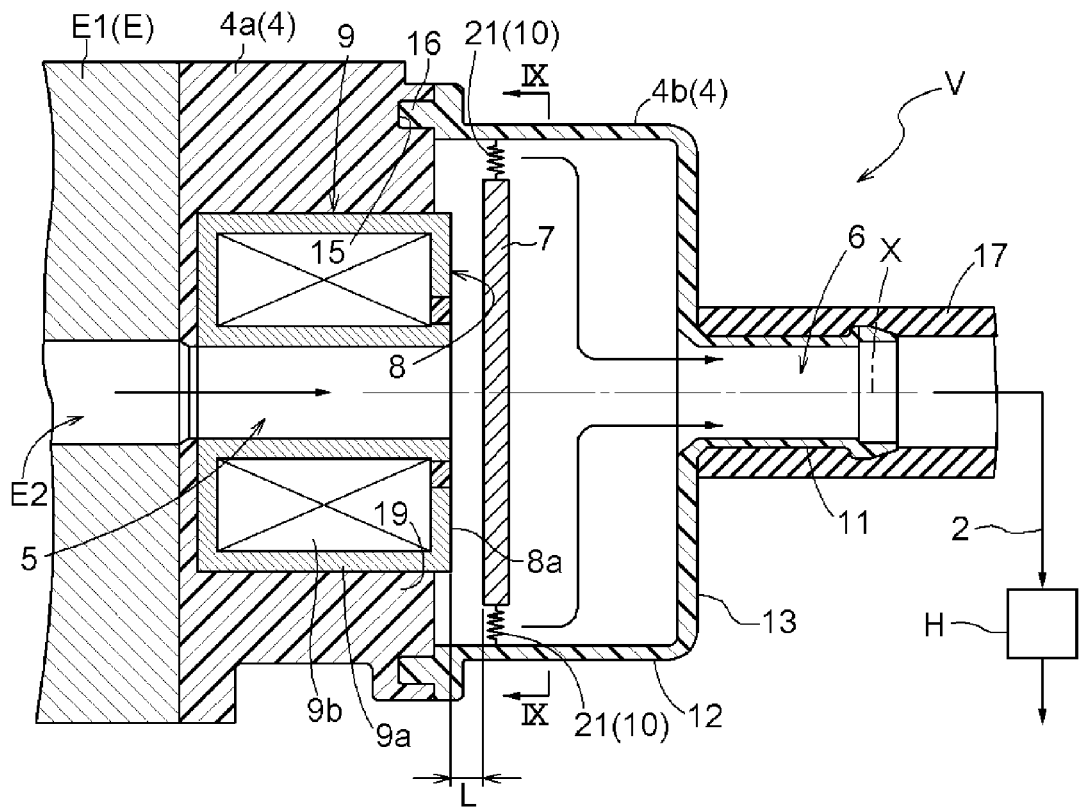
FIG. 8 is a cross-sectional view of the fluid control valve in an initial state according to the third embodiment disclosed here.
Figure 9:
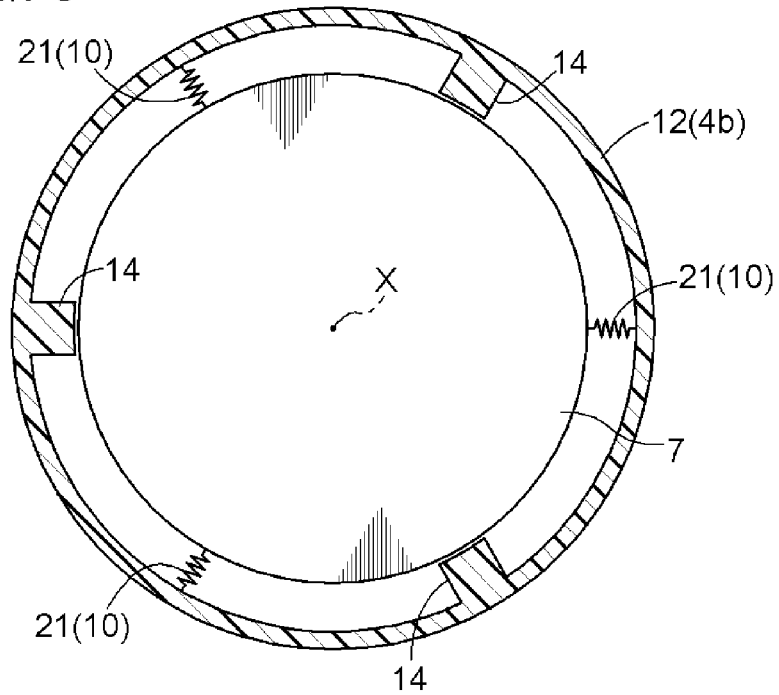
FIG. 9 is a cross-sectional view taken along line IX-IX in FIG. 8.

A third embodiment will be explained with reference to FIGS. 8 and 9. The fluid control valve V of the third embodiment includes the spring mechanism 10 including plural helical extension springs 21, for example, three helical extension springs 21, assembled between the outer peripheral portion of the valve element 7 and the inner peripheral portion of the cylindrical portion 12 of the second case 4b, instead of the spring mechanism 10 including the first coil spring 10a and the second coil spring 10b as in the first embodiment.

The valve element 7 is held at a position away from the valve seat 8 by the predetermined distance L by means of the helical extension springs 21. According to the present embodiment, the distance between the valve element 7 and the valve seat 8 may be specified by determining positions of the helical extension springs 21 along a longitudinal direction of the inflow passage 5. In this case, regardless of the strength of each of the helical extension springs 21, the position of the valve element 7 is decided, which may make it easy to specify or determine the predetermined distance L.

Further, because the valve element 7 is biased to be pulled radially outwardly by the three helical extension springs 21, the valve element 7 is stably positioned at a center of the inflow passage 5 at the inside of the second case 4b. Thus, the guide projecting portions 14 may be omitted from the second case 4b, which may lead to simple configurations of the fluid control valve V. The other configurations of the third embodiment are substantially the same as the configurations of the first embodiment.

The fluid control valve according to the first to third embodiments is applicable to a fluid control valve controlling a flow of fluid, for example, a flow of cooling water or oil for a vehicle.

According to the first to third embodiments, in a case where the solenoid 9 is inhibited from being supplied with the electric power, the valve element 7 and the valve seat 8 are inhibited from making contact with each other. The valve element 7 may move with the improved responsiveness in a direction to separate from the valve seat 8 in association with the increase of the fluid pressure at the inflow passage 5. Thus, a flow rate range in which the flow rate of the fluid is controllable may increase. In addition, in a case where the solenoid 9 is not powered, a pressure-receiving area of the valve element 7 that receives the fluid pressure at the inflow passage 5 is unchanged. Thus, a rapid increase of a clearance between the valve element 7 and the valve seat 8 may be restrained, which makes it easy to specify a small amount of minimum flow rate of the fluid. According to the fluid control valve V of the embodiments, the flow rate of the fluid is timely controllable within a wide flow rate range depending on the increase of the fluid pressure.

In addition, according to the first and second embodiments, the spring mechanism 10 includes the first coil spring 10a biasing the valve element 7 to approach the valve seat 8 and the second coil spring 10b biasing the valve element 7 to separate from the valve seat 8.

Accordingly, spring characteristics of the first coil spring 10a and the second coil spring 10b are appropriately selected to thereby specify the clearance between the valve element 7 and the valve seat 8 in the balanced state to a desired amount.

Further, according to the first and second embodiments, the spring mechanism 10 is configured so that the biasing force of the second coil spring 10b relative to the valve element 7 is released in association with the movement of the valve element 7 in a direction away from the valve seat 8.

Accordingly, a moving amount of the valve element 7 may be specified only by the spring characteristics of the first coil spring 10a in a case where the valve element 7 is separated from the valve seat 8 based on the fluid pressure. Thus, the moving amount of the valve element 7 may be easily specified.

Furthermore, according to the second embodiment, the valve element 7 includes the penetration bore 7a connecting between the inflow passage 5 and the outflow passage 6.

Accordingly, a minimum flow rate of the fluid may be easily specified.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A fluid control valve comprising:
    a body portion provided at a circulation flow passage that circulates fluid between an internal combustion engine and a heat exchanger;
    an inflow passage causing the fluid to flow into the body portion;
    an outflow passage causing the fluid to flow out of the body portion;
    a valve element adjusting a flow rate of the fluid;
    a valve seat including a contact portion relative to the valve element, the contact portion being provided to face a downstream side of a circulating direction of the fluid;
    a solenoid causing the valve element to make contact with the valve seat in a state where the solenoid is supplied with an electric power;
    a spring mechanism holding the valve element to be balanced at a position at which the valve element is away from the valve seat by a predetermined distance when the solenoid is inhibited from being supplied with the electric power and at the same time the fluid is inhibited from flowing;
    the spring mechanism including a first coil spring biasing the valve element to approach the valve seat and a second coil spring biasing the valve element to separate from the valve seat; and
    an outside diameter of the second coil spring being larger than an outside diameter of the first coil spring; and
    one end of the second coil spring being located at an outer peripheral side of the valve seat.

2. The fluid control valve according to claim 1, wherein the spring mechanism is configured so that a biasing force of the second spring relative to the valve element is released in association with a movement of the valve element in a direction away from the valve seat.

3. The fluid control valve according to claim 2, wherein the valve element includes a penetration bore connecting between the inflow passage and the outflow passage.

4. The fluid control valve according to claim 1, wherein the valve element includes a penetration bore connecting between the inflow passage and the outflow passage.

5. The fluid control valve according to claim 1, further comprising:
    a first case accommodating the solenoid;
    the first case including an annular recess portion located at the outer peripheral side of the valve seat; and
    the one end of the second spring being fitted and fixed to the annular recess portion.

\* \* \* \* \*